US010443317B2

(12) United States Patent
O'Grady et al.

(10) Patent No.: US 10,443,317 B2
(45) Date of Patent: Oct. 15, 2019

(54) ELECTRICAL TEST SPLICE FOR COILED TUBING SUPPORTED WELL PUMP

(71) Applicant: Baker Hughes Incorporated, Houston, TX (US)

(72) Inventors: Kenneth O'Grady, Collinsville, OK (US); Jackson Reynolds, Claremore, OK (US); John Mack, Catoosa, OK (US); David R. Roy, Midland, TX (US); Scott C. Strattan, Broken Arrow, OK (US)

(73) Assignee: Baker Huges, a GE Company, LLC, Houston, TX (US)

( * ) Notice: Subject to any disclaimer, the term of this patent is extended or adjusted under 35 U.S.C. 154(b) by 261 days.

(21) Appl. No.: 15/585,663

(22) Filed: May 3, 2017

(65) Prior Publication Data

US 2018/0323587 A1 Nov. 8, 2018

(51) Int. Cl.
*H01R 13/523* (2006.01)
*E21B 17/02* (2006.01)
(Continued)

(52) U.S. Cl.
CPC .......... *E21B 17/028* (2013.01); *E21B 17/003* (2013.01); *E21B 17/20* (2013.01);
(Continued)

(58) Field of Classification Search
CPC ........ H01R 13/523; H01R 4/52; H01R 4/646; H01R 9/031; H01R 9/038; H01R 9/0512;
(Continued)

(56) References Cited

U.S. PATENT DOCUMENTS 3,383,642 A * 5/1968 Nava .................. H01R 31/02
174/84 R
3,879,659 A * 4/1975 Lawson, Jr. .......... B65H 75/04
242/362
(Continued)

FOREIGN PATENT DOCUMENTS

WO 2016177996 A1 11/2016

OTHER PUBLICATIONS

Related U.S. Appl. No. 15/399,130, filed Jan. 5, 2017.
International Search Report and Written Opinion dated Jul. 4, 2018 for corresponding PCT/US2018/028923.

*Primary Examiner* — William H. Mayo, III
*Assistant Examiner* — Krystal Robinson
(74) *Attorney, Agent, or Firm* — Bracewell LLP; James E. Bradley (57) ABSTRACT

A splice connects a lower coiled tubing segment containing a lower power cable segment to an upper coiled tubing segment containing an upper power cable segment. The splice has a lower terminal electrically connecting together upper ends of lower power conductors. An upper terminal electrically connects together lower ends of upper power conductors. An electrical intermediate connector has an upper end that stabs into engagement with the upper electrical terminal and a lower end that stabs into engagement with the lower electrical terminal. A load supporting member surrounds the intermediate connector and joins to upper and lower ends, respectively, of the lower coiled tubing segment and the upper coiled tubing segment.

20 Claims, 6 Drawing Sheets

(51) Int. Cl.
*E21B 17/00* (2006.01)
*E21B 43/12* (2006.01)
*E21B 17/20* (2006.01)
*H02G 1/14* (2006.01)

(52) U.S. Cl.
CPC ............ *E21B 43/128* (2013.01); *H02G 1/14* (2013.01); *H01R 13/523* (2013.01)

(58) Field of Classification Search
CPC ...... H01R 9/0518; H01R 9/11; H01R 12/596; H01R 13/655; H01R 4/2408; H01R 4/44; H01R 4/4818; H01R 9/032; H01R 13/5205; H01L 2924/00014; H01L 39/02; H01B 7/046; H01B 7/385; H01B 13/06; H01B 13/14; H01B 3/004; H01B 3/427; H01B 3/445; H01B 9/00
USPC ........................................................ 439/271
See application file for complete search history.

(56) References Cited

U.S. PATENT DOCUMENTS

| | | | | |
|---|---|---|---|---|
| 4,154,302 A * | 5/1979 | Cugini | ................ | E21B 33/0407 166/378 |
| 4,370,518 A * | 1/1983 | Guzy | ................ | H02G 15/1806 156/49 |
| 4,436,565 A * | 3/1984 | Weitzel | ................ | H05B 3/0004 156/49 |
| 4,627,490 A * | 12/1986 | Moore | ................ | E21B 17/003 166/106 |
| 5,377,747 A * | 1/1995 | Didier | ................ | E21B 33/04 166/65.1 |
| 5,762,135 A * | 6/1998 | Moore | ................ | E21B 17/003 166/379 |
| 6,145,597 A | 11/2000 | Kobylinski | | |
| 6,192,983 B1 * | 2/2001 | Neuroth | ................ | E21B 17/028 166/250.15 |
| 6,298,917 B1 | 10/2001 | Kobylinski et al. | | |
| 6,459,270 B1 * | 10/2002 | Kruchowy | ........... | G01R 31/021 324/514 |
| 6,545,221 B1 | 4/2003 | Halpert et al. | | |
| 7,575,458 B2 * | 8/2009 | Parmeter | ................ | H01R 13/521 439/271 |
| 9,774,131 B2 * | 9/2017 | Painter | ................ | H01R 13/41 |
| 9,840,210 B2 * | 12/2017 | Yamaguchi | ......... | B60R 16/0207 |
| 10,036,210 B2 * | 7/2018 | Maclean | ................ | E21B 17/003 |
| 2001/0001623 A1 * | 5/2001 | Inada | ................ | G02B 6/255 385/99 |
| 2003/0148638 A1 | 8/2003 | McHugh et al. | | |
| 2005/0189130 A1 * | 9/2005 | Bertini | ................ | H01B 7/285 174/25 C |
| 2005/0192708 A1 * | 9/2005 | Bertini | ................ | H01B 7/285 700/265 |
| 2006/0199411 A1 * | 9/2006 | Singh | ................ | H01R 13/625 439/314 |
| 2009/0021393 A1 * | 1/2009 | Layton | ................ | G01V 11/002 340/854.9 |
| 2009/0277646 A1 * | 11/2009 | Guven | ................ | E21B 17/02 166/378 |
| 2010/0029113 A1 * | 2/2010 | Smith, III | ............. | H01R 4/625 439/271 |
| 2013/0052055 A1 | 2/2013 | Frey et al. | | |
| 2013/0236332 A1 * | 9/2013 | Frey | ................ | F04B 17/03 417/313 |
| 2014/0335712 A1 * | 11/2014 | Semple | ................ | E21B 43/128 439/271 |
| 2015/0125325 A1 * | 5/2015 | Flett | ................ | H02K 5/225 417/423.3 |
| 2016/0036161 A1 * | 2/2016 | Brown | ................ | H01R 39/64 439/271 |
| 2017/0350198 A1 * | 12/2017 | Ma | ................ | E21B 17/00 |

* cited by examiner

ELECTRICAL TEST SPLICE FOR COILED TUBING SUPPORTED WELL PUMP

FIELD OF THE DISCLOSURE

This disclosure relates in general to electrical submersible well pumps supported by coiled tubing, and in particular to a splice between a lower coiled tubing installed in the well and an upper coiled tubing on a reel at the surface for retrieval. The splice enables electrical insulation testing of the upper and lower lengths of coiled tubing and the pump motor during re-running.

BACKGROUND

Electrical submersible well pumps (ESP) are often used to pump liquids from hydrocarbon producing wells. In many installations, the ESP secures to a lower end of a string of production tubing. The production tubing is made up of sections of pipe about 30 feet long secured together by threads. When the ESP has to be retrieved for repair, a rig must be installed to pull the production tubing and ESP from the well.

Another type of installation secures the ESP to a lower end of a string of coiled tubing. Coiled tubing is a continuous steel conduit that can be rolled onto and off of a reel. A power cable in installed within the coiled tubing. The ESP pumps well fluid up an annulus around the coiled tubing. A rig is not needed to pull the coiled tubing. Instead a coiled tubing injector is brought to the well site. The coiled tubing in the well may be spliced to a length of coiled tubing on the surface that feeds through the coiled tubing injector. After retrieving the coiled tubing, the operator may wish to re-run the coiled tubing with a replacement ESP.

SUMMARY

A power cable and load supporting assembly for a submersible well pump includes a lower coiled tubing segment having a lower end for securing to the well pump. A lower power cable segment has three insulated lower power conductors and is installed within the lower coiled tubing segment. An upper coiled tubing segment for installation on a reel at an upper end of the well has an upper power cable segment having three insulated upper power conductors and installed within the upper coiled tubing segment. A splice connects the lower coiled tubing segment and the lower power cable segment to the upper coiled tubing segment and the upper power cable segment. The splice has a lower terminal electrically connecting together upper ends of the lower power conductors. An upper terminal electrically connects together lower ends of the upper power conductors. An intermediate connector electrically joins together the lower and upper terminals. A load supporting member surrounds the intermediate connector and is joined to upper and lower ends, respectively, of the lower coiled tubing segment and the upper coiled tubing segment.

In the embodiment shown, the intermediate connector comprises an electrically conductive rod having at least one end that stabs into mating engagement with one of the terminals. The electrically conductive rod may have a lower end that stabs into engagement with the lower terminal and an upper end that stabs into engagement with the upper terminal. The rod may be located on a longitudinal axis of the splice.

In the example shown, a receptacle is formed within the upper end of the lower power cable segment. Each of the lower power conductors has an exposed portion within the receptacle. The lower terminal comprises an electrically conductive base that fits within the receptacle in contact with the exposed portions of each of the lower power conductors. An electrical contact is on an upper end of the base in engagement with the intermediate connector.

The lower power cable segment may have an elastomeric lower jacket in which each of the lower power conductors is embedded. The lower receptacle may be formed within the lower jacket at the upper end of the lower power cable segment and concentric with a longitudinal axis of the splice. The lower receptacle may have threads within a side wall of the lower receptacle. The threads intersect each of the exposed portions of the lower power conductors. The lower terminal has an electrically conductive lower base that engages the threads in the lower receptacle. A lower electrical contact is on an upper end of the lower base for engagement with a lower end of the intermediate connector. The splice at the upper power cable may have the same features.

The splice defines an electrical continuity path for each of the upper power conductors from the upper ends of each of the upper power conductors to the upper terminal, and from the upper terminal through the intermediate connector and to the lower power conductors in parallel.

The upper ends of the lower power conductors may be flush with an upper end of the lower jacket. The lower ends of the upper power conductors may be flush with a lower end of the lower jacket.

DETAILED DESCRIPTION OF THE DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about"

includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
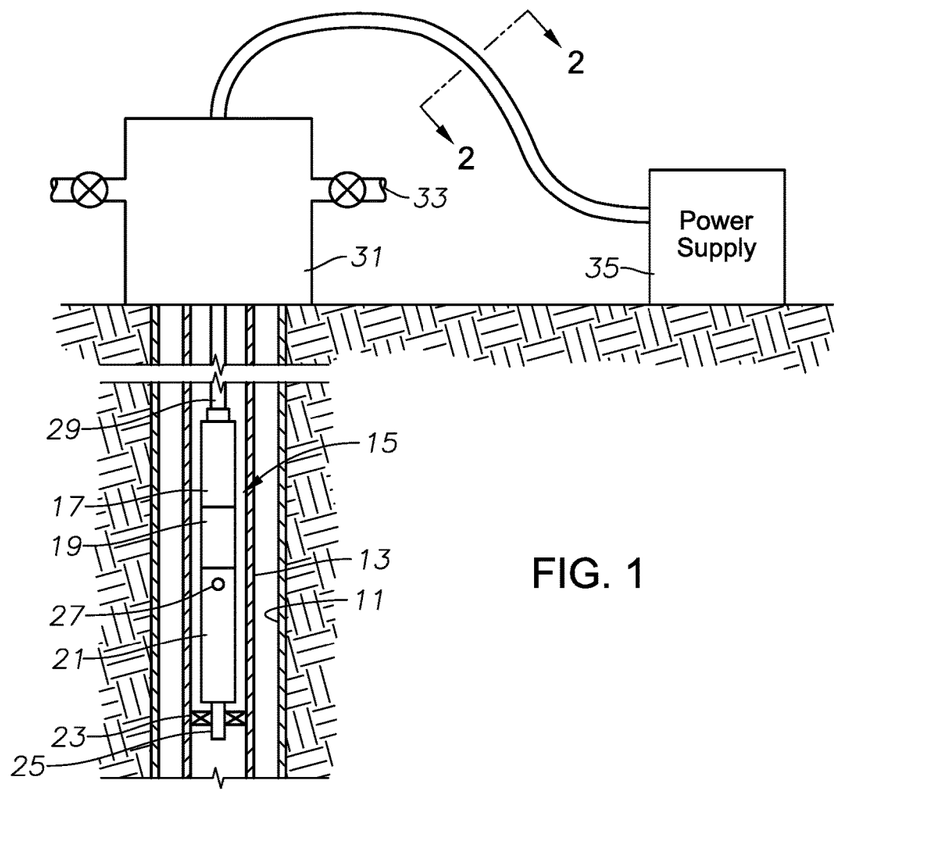
FIG. 1 is a schematic view of an electrical submersible pump supported by a lower coiled tubing segment in a well prior to installing a splice in accordance with this invention.

Referring to FIG. 1, a well casing 11 has a string of production tubing 13. An electrical submersible pump (ESP) 15 is located within production tubing 13. In this example, ESP 15 has an electrical motor 17 on the upper end. A seal section 19 connects to the lower end of motor 17 and has a pressure equalizer to reduce a pressure differential between lubricant in motor 17 and well fluid on the exterior. A pump 21 secures to the lower end of seal section 19. Pump 21 may be a centrifugal pump with a large number of stages, each stage having an impeller and a diffuser. Pump 21 has an intake 25 that extends through a packer 23 for drawing in well fluid. Pump 27 has a discharge 27 on its upper end that discharges well fluid into an annulus surrounding seal section 19 and motor 17 within production tubing 13. Other configurations and types of ESP 15 are feasible.

A lower coiled tubing segment 29 connects to the upper end of motor 17 and supports ESP 15 within production tubing 13. Lower coiled tubing segment 29 comprises a continuous length of a steel tube that has a capability of being wound around a large reel when out of the well. A wellhead assembly or tree 31 supports lower coiled tubing segment 29 in production tubing 13. Well fluid being pumped by ESP 15 flows from production tubing 13 into wellhead assembly 31 and out a flow line 33. Lower coiled tubing segment 29 extends upward through wellhead assembly 31 and is electrically connected to an adjacent controller or power supply 35.

Figure 2:
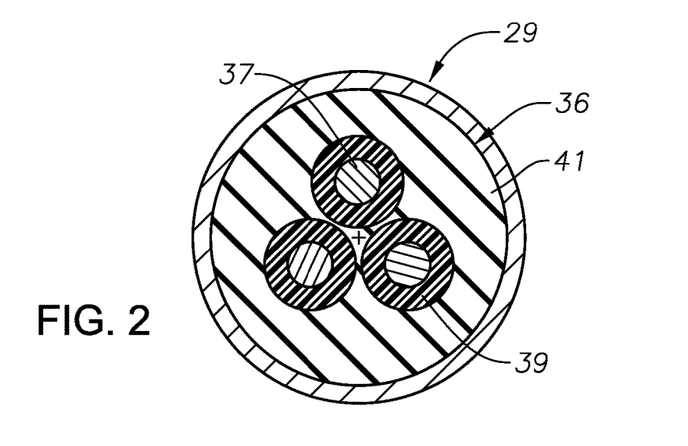
FIG. 2 is a sectional view of the lower coiled tubing segment of FIG. 1, taken along the line 2-2 of FIG. 1.

Referring to FIG. 2, lower coiled tubing segment 29 contains a lower electrical power cable 36 for supplying three-phase electrical power to motor 17 (FIG. 1). Lower power cable 36 has three power conductors 37 that are arranged 120 degrees apart from each other relative to a centerline of power cable 36. Each lower power conductor 37 is encased in one or more separate electrical insulation layers 39. Also, the three lower power conductors 37 and their insulation layers 39 may be embedded within an elastomeric jacket 41, which is extruded over lower power conductors 37.

The exterior of jacket 41 is cylindrical and optionally may have a helical wrap of a strip of armor (not shown) surrounding it. Lower power cable 36 may be installed in lower coiled tubing segment 29 while lower coiled tubing segment 29 is being rolled into a cylindrical shape and seam welded. Alternately, lower power cable 36 may be pulled into lower coiled tubing segment 29 after lower coiled tubing segment 29 has been manufactured. Lower power cable 36 normally lacks the ability to support its own weight in a well, thus various arrangements may be made to frictionally transfer the weight of lower power cable 36 to lower coiled tubing segment 29 along the length of lower coiled tubing segment 29.

Figure 3:
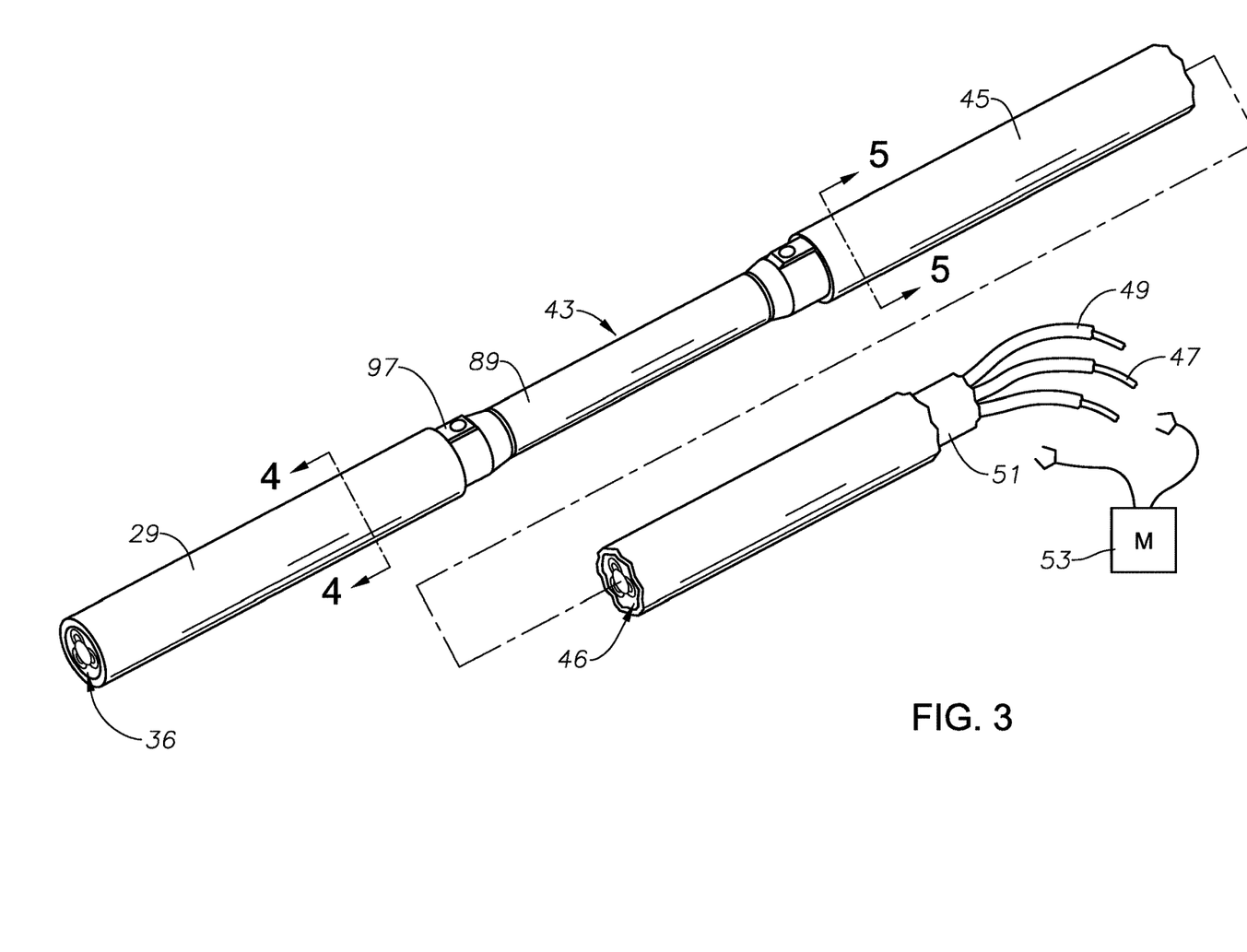
FIG. 3 is an isometric view of a splice connecting the lower coiled tubing segment of FIG. 1 to an upper coiled tubing segment.

Referring to FIG. 3, when ESP 15 (FIG. 1) and lower coiled tubing segment 29 are to be retrieved, lower power conductors 37 are disconnected from power supply 35. Then, a splice 43 may be made to connect the upper end of lower coiled tubing segment 29 to an upper coiled tubing segment 45 brought to the well site. As will be explained below, upper coiled tubing segment 45 will interface with equipment for pulling lower coiled tubing segment 45.

Upper coiled tubing segment 45 may be identical to lower coiled tubing segment 29, except that the length of upper coiled tubing segment 45 will normally be much shorter. For example, upper coiled tubing segment 45 may be less than 1000 feet in length, while lower coiled tubing segment 29 will often be several thousand feet in length. Upper coiled tubing segment 45 has an upper power cable 46 with three upper power conductors 47, each having an insulation layer 49 with a jacket 51 extruded over.

If lower coiled tubing segment 29 is in good condition, the operator may wish to re-run lower coiled tubing segment 29, normally with a replacement ESP 15. While re-running lower coiled tubing segment 29, damage can occur to lower coiled tubing segment 39 or to motor 17 of the replacement ESP 15. At selected depths during the re-running, the operator may wish to check the insulation integrity of lower power conductors 37 of lower coiled tubing segment 29 as well as the stator windings in motor 17.

As explained below, splice 43 is configured to not only support the weight of lower coiled tubing segment 29, but also to electrically connect power cable 36 in lower coiled tubing segment 29 with power cable 46 in upper coiled tubing segment 45 for insulation test purposes. To reduce the complexity and overall diameter of splice 43, splice 43 connects the individual upper power conductors 47 in upper coiled tubing segment 45 in parallel to the three lower power conductors 37 in lower coiled tubing segment 29. That is, each upper power conductor 47 in upper coiled tubing segment 45 does not separately connect to one of the lower power conductors 37 in lower coiled tubing segment 29. Rather, the lower ends of upper power conductor 47 in upper coiled tubing segment 45 are shorted to each other and connected to shorted upper ends of the lower power conductors 37 in lower coiled tubing segment 29.

Splice 43 places lower coiled tubing segment 29 in electrical continuity with upper coiled tubing segment 45, each of which is electrically conductive. The lower end of lower coiled tubing segment 29 is in electrical continuity with the housing of motor 17 (FIG. 1). The stator windings of motor 17 will be electrically insulated from the housing of motor 17 unless a defect occurs. The lower ends of the windings will be connected together, typically in a Y connection. Splice 43 thus creates an electrical continuity path from any one of upper power conductors 47 at the upper end of upper coiled tubing segment 45 through any of the lower power conductors 37 in lower coiled tubing segment 29 and through the windings in motor 17.

For the insulation test, a conventional meter 53 (FIG. 3) has a lead that will connect to the upper end of any one of the upper power conductors 47 in upper coiled tubing segment 45. The other lead will connect to the upper end of upper coiled tubing segment 45. Meter 53 measures the resistance between the particular upper conductor 47 and upper coiled tubing segment 45. The resistance should approach infinity, and if the resistance is below a selected level, an insulation defect may exist in one or more of the upper power conductors 47, lower power conductors 37, or windings of motor 17.

Figure 4:
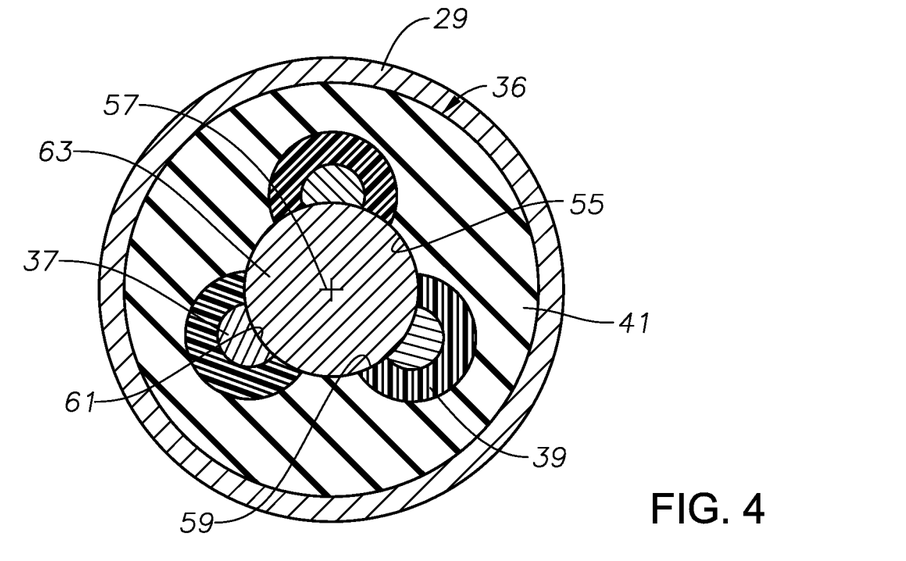
FIG. 4 is a sectional view of a lower part of the splice of FIG. 3, taken along the line 4-4 of FIG. 3.

Referring to FIG. 4, to form splice 43 in this embodiment, an upper portion of lower power cable 36 in lower coiled tubing segment 29 will be removed a few inches from the upper end of lower coiled tubing segment 29. The upper ends of lower power conductors 37 and jacket 41 in lower power cable 36 will be flush with the resected upper end of lower power cable 36. Then, a hole or receptacle 55 will be drilled into jacket 41 in the upper end of lower power cable 36. Receptacle 55 has a cylindrical side wall and is concentric with an axis 57 of splice 43 in this embodiment. The diameter of receptacle 55 is selected to remove a circumferentially extending portion of each insulation layer 39. The removal of part of each insulation layer 39 creates opposed edges 59 for each insulation layer 39 that are flush with the inner diameter of receptacle 55. Also, drilling receptacle 55 removes part of the metal of each conductor 37 and exposes a concave bare metal portion 61 of part of each conductor 37 flush with the side wall of receptacle 55. Receptacle 55 has a depth that may be only an inch or so.

Then, a lower electrical terminal base 63 is secured in receptacle 55. Lower terminal base 63 is electrically conductive, thus will short the upper ends of lower power conductors 37 to each other. Lower terminal base 63 may be a solid member, as shown.

Figure 5:
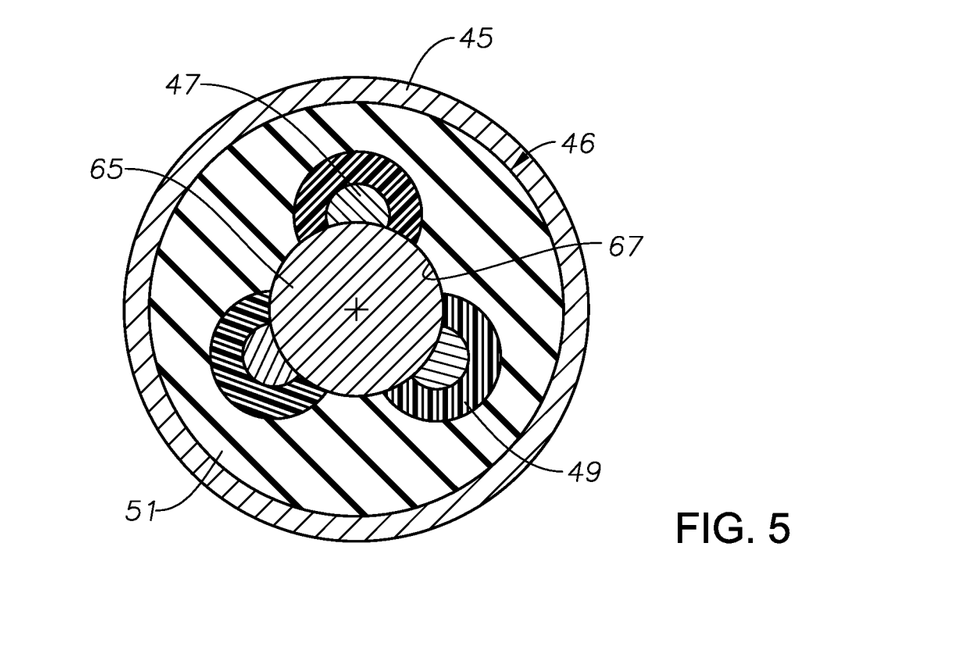
FIG. 5 is a sectional view of an upper part of the splice of FIG. 3, taken along the line 5-5 of FIG. 3.

Referring to FIG. 5, the same procedure is repeated for upper coiled tubing segment 45. A technician drills a receptacle 67 and installs an upper terminal base 65 of an upper terminal within it. Upper terminal base 65 shorts the lower ends of upper power conductors 47 to each other.

Figure 6A:
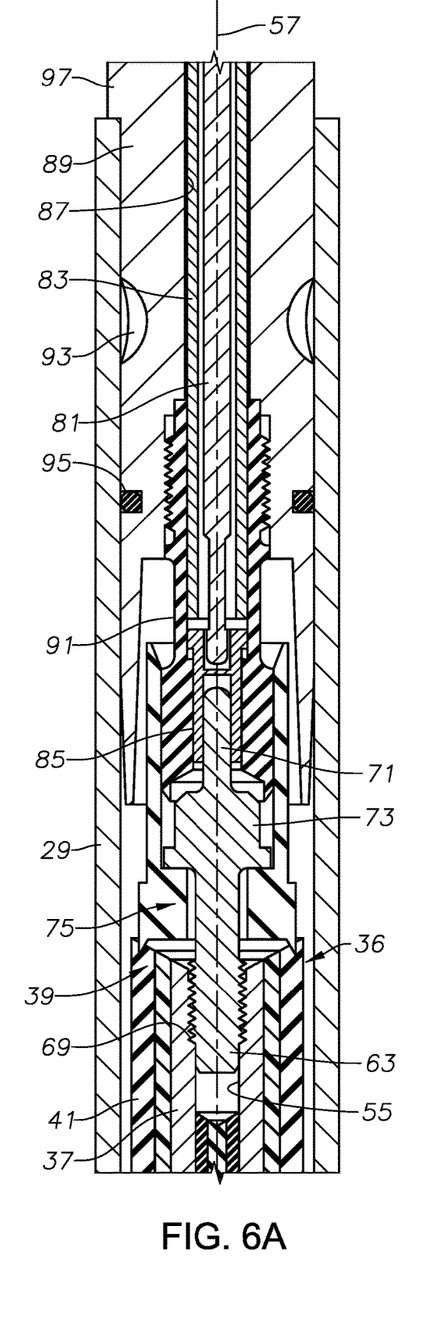
FIGS. 6A and 6B comprise a sectional view of the splice of FIG. 3

Referring to FIG. 6A, lower terminal base 63 of lower coiled tubing segment 29 may have external threads 69 that engage mating threads formed in the side wall of receptacle 55. A portion of the mating threads in receptacle 55 will be formed in the exposed lower power conductor portions 61. Lower terminal base 63 has an electrical contact 71 on its upper end that may be a pin, as shown, or a sleeve. An enlarged diameter body 73 optionally may be located between lower terminal base 63 and lower electrical contact 71. Body 73 retains an insulation sleeve 75 that electrically insulates lower terminal body 73 from the inner side wall of lower coiled tubing segment 29.

Figure 6B:
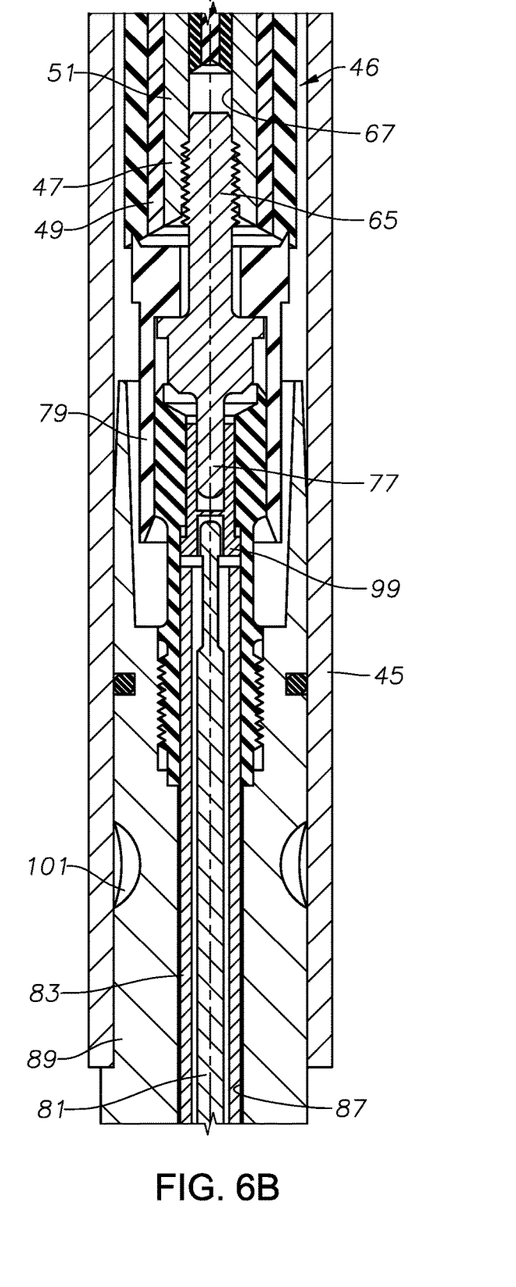

Referring to FIG. 6B, the upper end of the power cable portion of splice 43 may be identical to the lower end just described. Upper terminal base 65 has an upper electrical contact 77, which may also be a pin, or it could be a sleeve type. An upper terminal insulation sleeve 79 surrounds the portion of the upper terminal protruding downward from upper terminal base 65.

Referring again to FIG. 6A, an electrical intermediate connector member or rod 81 electrically connects lower terminal base 63 in lower coiled tubing segment 29 with upper terminal base 65 in upper coiled tubing segment 45. Electrical connector rod 81 is encased in an insulation sleeve 83 and has a lower electrical contact 85 that stabs into engagement with lower terminal electrical contact 71. Lower contact 85 is illustrated as a sleeve, but it could be a pin. Connector rod 81 extends on axis 57 through a bore 87 in a load supporting member 89. In this example, an insulation sleeve 91 secures to the lower end of load supporting member 89 by threads and slides into lower terminal insulation sleeve 75.

Load supporting member 89 is a metal shaft that supports the weight of lower coiled tubing segment 29. Load supporting member 89 inserts into the inner diameter of lower coiled tubing segment 29 after lower terminal base 63 has been installed. Load supporting member 89 may be connected to lower coiled tubing segment 29 in various manners. In this embodiment, load supporting member 89 has a number of depressions or recesses 93 on its outer cylindrical surface. After insertion, a technician makes dimples (not shown) in lower coiled tubing segment 29 that protrude into recesses 93 to secure load supporting member 89. Load supporting member 89 may have a seal 95 on its outer diameter that seals against the inner diameter of lower coiled tubing segment 29. A protruding stop shoulder 97 on the exterior of load supporting member 89 abuts the upper end of lower coiled tubing segment 29 to provide a limit on the amount of insertion of load supporting member 89 into lower coiled tubing segment 29. The outer diameter of load supporting member 89 is no greater, and in this embodiment less, than the outer diameter of upper and lower coiled tubing segments 29, 45.

Figure 7:
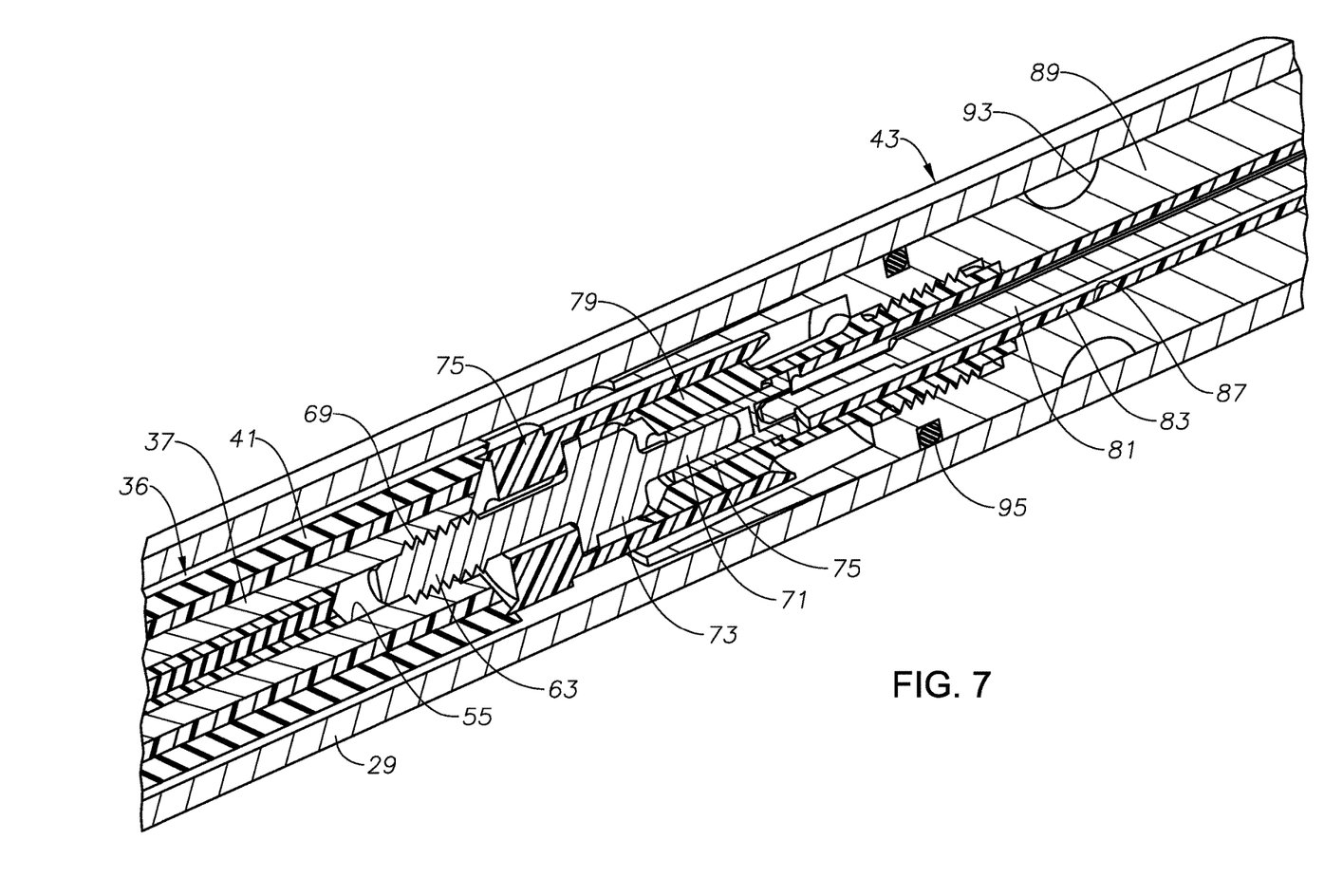
FIG. 7 is an isometric view of a lower portion of the splice of FIG. 3, shown partly sectioned.

FIG. 7 is an isometric view illustrating the features at the lower end of splice 43. The features at the upper end of splice 43 are not shown in FIG. 7 but are identical.

Referring to FIG. 6B, connector rod 81 has an upper end with an electrical contact 99 that stabs into engagement with upper terminal pin 77 in upper coiled tubing segment 45. Afterward, a technician will secure the upper end of load supporting member 89 to upper coiled tubing segment 45 in the same manner, by forming dimples into recesses 101.

Figure 8:
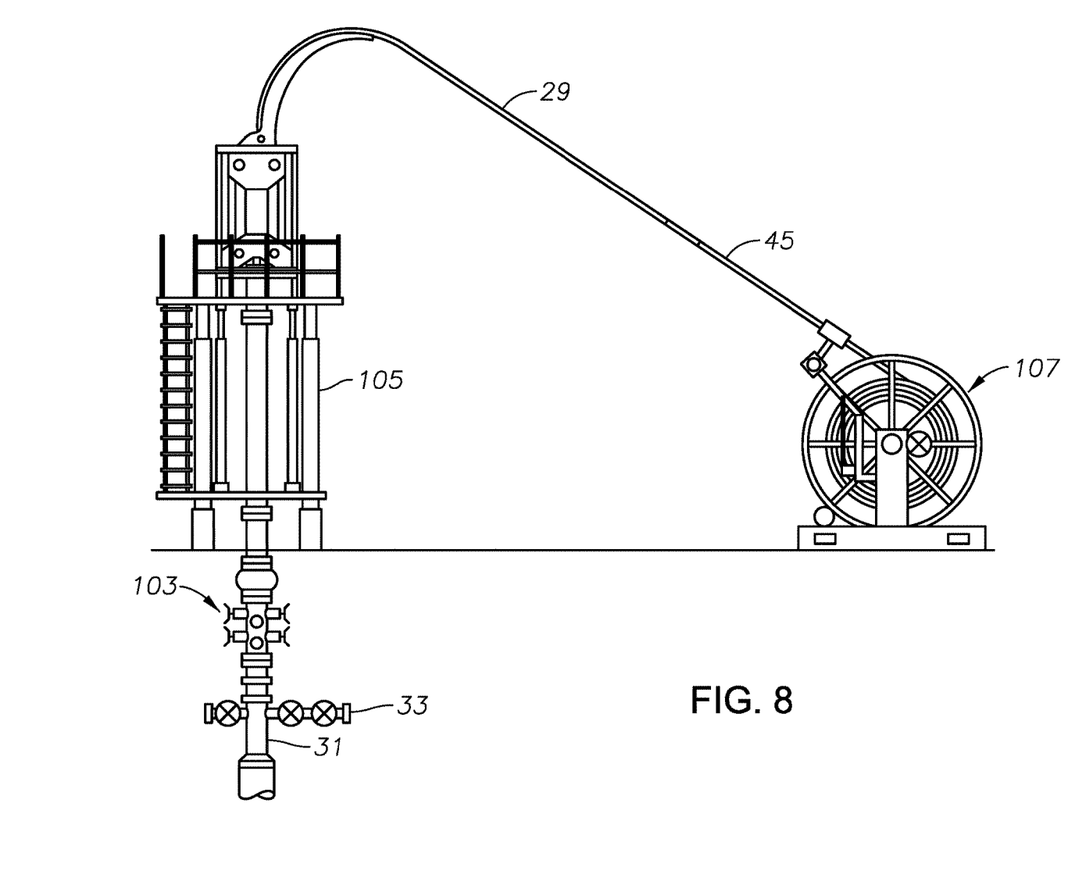
FIG. 8 is a schematic view illustrating the upper and lower coiled tubing segments spliced together to retrieve the lower coiled tubing segment from the well.

FIG. 8 illustrates equipment employed for running and retrieving lower coiled tubing segment 29. Conventional pressure control equipment 103 may be installed on wellhead assembly 31 before retrieving. A coiled tubing injector 105 will be placed above pressure control equipment 103. A reel 107 containing upper coiled tubing segment 45 will be brought to the well site. Technicians will connect the upper end of lower coiled tubing segment 29 to the lower end of upper coiled tubing segment 45 with splice 43. The lower end of upper coiled tubing segment 45 may be inserted down through coiled tubing injector 105 before forming splice 43. As coiled tubing injector 105 pulls up lower coiled tubing segment 29, splice 43 will pass upward through coiled tubing injector 105. Reel 107 will rotate, winding splice 43 and lower coiled tubing segment 29 onto reel 107. After replacing ESP 15 (FIG. 1), the operator reverses coiled tubing injector 105 and runs lower coiled tubing segment 29 back into the well.

While running, the operator will stop the movement of coiled tubing injector 105 and reel 107 at various depths. The upper end of upper coiled tubing segment 45 will be accessible in the open hub of reel 107. Technicians will monitor the insulation resistance with meter 53 (FIG. 3) at various depths.

Once at the total depth, technicians will secure the upper end of lower coiled tubing segment 29 to wellhead assembly 31 and remove splice 43. The three power conductors 37 (FIG. 2) of power cable 36 in lower coiled tubing segment 29 will be connected to terminals of power supply 35 (FIG. 1). The remaining portion of upper coiled tubing segment 45 will be re-wound on reel 107 (FIG. 8) and removed.

The present invention described herein, therefore, is well adapted to carry out the objects and attain the ends and advantages mentioned, as well as others inherent therein. The splice can pass through the coil tubing injector because the outer diameter of the load supporting member is no greater than the outer diameters of the upper and lower coiled tubing segments. Using only a single terminal at the upper end of the lower coiled tubing segment and at the lower end of the upper coiled tubing segment reduces the number of parts and complexity of the splice. The insulation in the power cables in both the upper and lower coiled tubing segments is tested at the same time.

While only a few embodiments of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. A power cable and load supporting assembly for a submersible well pump, comprising:
   a lower coiled tubing segment having a lower end for securing to the well pump;
   a lower power cable segment having three insulated lower power conductors and installed within the lower coiled tubing segment;
   an upper coiled tubing segment for installation on a reel at an upper end of the well;
   an upper power cable segment having three insulated upper power conductors and installed within the upper coiled tubing segment;
   a test splice connecting the lower coiled tubing segment and the lower power cable segment to the upper coiled tubing segment and the upper power cable segment, comprising:
   an electrically conductive lower terminal electrically shorting together upper ends of the lower power conductors;
   an electrically conductive upper terminal electrically shorting together lower ends of the upper power conductors;
   an intermediate connector that electrically joins together the lower and upper terminals;
   a load supporting member surrounding the intermediate connector and joined to upper and lower ends, respectively, of the lower coiled tubing segment and the upper coiled tubing segment; wherein
   the test splice prevents power from being supplied to the motor through the upper coiled tubing segment but enables electrical insulation testing of the lower power cable segment while the submersible well pump is being lowered into the well; and
   the test splice is positioned so as to be removable from the lower coiled tubing segment along with the upper coiled tubing segment after reaching total depth for the submersible well pump and before operation of the submersible well pump.

2. The assembly according to claim 1, wherein the intermediate connector comprises:
   an electrically conductive rod having at least one end that stabs into mating engagement with one of the terminals.

3. The assembly according to claim 1, wherein the intermediate connector comprises:
   an electrically conductive rod having a lower end that stabs into engagement with the lower terminal and an upper end that stabs into engagement with the upper terminal.

4. The assembly according to claim 1, wherein the intermediate connector comprises:
   an insulated electrically conductive rod having a lower end that stabs into engagement with the lower terminal and an upper end that stabs into engagement with the upper terminal; and
   wherein the rod is located on a longitudinal axis of the splice.

5. The assembly according to claim 1, further comprising:
   a receptacle formed within the upper end of the lower power cable segment;
   each of the lower power conductors having an exposed portion within the receptacle; wherein the lower terminal comprises:
   an electrically conductive base that fits within the receptacle in contact with the exposed portions of each of the lower power conductors; and
   an electrical contact on an upper end of the base in engagement with the intermediate connector.

6. The assembly according to claim 1, further comprising:
   an elastomeric lower jacket in which each of the lower power conductors is embedded;
   a lower receptacle formed within the lower jacket at the upper end of the lower power cable segment and concentric with a longitudinal axis of the splice;
   each of the lower power conductors having an exposed portion within the lower receptacle;
   threads within a side wall of the lower receptacle, the threads intersecting each of the exposed portions of the lower power conductors; wherein the lower terminal comprises:
   an electrically conductive lower base that engages the threads in the lower receptacle; and
   a lower electrical contact on an upper end of the lower base for engagement with a lower end of the intermediate connector.

7. The assembly according to claim 6, further comprising:
   an elastomeric upper jacket in which each of the upper power conductors is embedded;
   an upper receptacle formed within the upper jacket at the lower end of the upper power cable segment and concentric with a longitudinal axis of the splice;
   each of the upper power conductors having an exposed portion within the upper receptacle;
   threads within a side wall of the upper receptacle and intersecting each of the exposed portions of the upper power conductors; wherein the upper terminal comprises:
   an electrically conductive upper base that engages the threads in the upper receptacle; and
   an upper electrical contact on a lower end of the upper base for engagement with an upper end of the intermediate connector.

8. The assembly according to claim 1, wherein:
   the splice defines an electrical continuity path for each of the upper power conductors from the upper ends of each of the upper power conductors to the upper terminal, and from the upper terminal through the intermediate connector and to the lower power conductors in parallel.

9. The assembly according to claim 1, wherein:
   the lower power conductors are embedded within an elastomeric lower jacket;
   the upper ends of the lower power conductors are flush with an upper end of the lower jacket;
   the upper power conductors are embedded within an elastomeric upper jacket; and
   the lower ends of the upper power conductors are flush with a lower end of the lower jacket.

10. A power cable and load supporting assembly for a submersible well pump, comprising:
    a lower coiled tubing segment having a lower end for securing to the well pump;
    a lower power cable segment having three lower power conductors and installed within the lower coiled tubing segment, each of the lower power conductors having a separate insulation layer;
    an upper coiled tubing segment for installation on a reel at an upper end of the well;

an upper power cable segment having three upper power conductors and installed within the upper coiled tubing segment, each of the upper power conductors having a separate insulation layer;

a test splice connecting the lower coiled tubing segment and the lower power cable segment to the upper coiled tubing segment and the upper power cable segment, the test splice having a longitudinal axis and comprising:

an electrically conductive lower terminal electrically shorting together upper ends of the lower power conductors, the lower terminal having an upward extending lower electrical contact;

an electrically conductive upper terminal electrically shorting together lower ends of the upper power conductors, the upper terminal having a downward extending upper electrical contact;

an electrical intermediate connector having an upper end that stabs into engagement with the upper electrical contact and a lower end that stabs into engagement with the lower electrical contact;

a load supporting member surrounding the intermediate connector and joined to upper and lower ends, respectively, of the lower coiled tubing segment and the upper coiled tubing segment; wherein the test splice does not allow power to be supplied through the upper coiled tubing segment to the motor but enables electrical insulation testing of the lower power cable segment while the submersible well pump is being lowered into the well; and a length of the lower coiled tubing segment is selected such that the test splice and the upper coiled tubing segment may be detached from the lower coiled tubing segment after reaching total depth for the submersible well pump and before operation of the submersible well pump.

11. The assembly according to claim 10, wherein the upper and lower electrical contacts and the intermediate connector are located on the axis.

12. The assembly according to claim 10, further comprising:

a lower receptacle formed in an upper end of the lower power cable on the axis, the lower receptacle having a cylindrical side wall;

each of the insulation layers of the lower power conductors having circumferentially spaced apart edges flush with the side wall, defining an exposed portion of each of the lower power conductors to an interior of the receptacle; and the lower terminal having a base that fits within the receptacle, the base having an outer cylindrical surface in contact with each of the exposed portions of the lower power conductors.

13. The assembly according to claim 12, wherein:
the lower power conductors and their insulation layers are embedded within an elastomeric jacket; and
the receptacle is formed in the jacket.

14. The assembly according to claim 12, wherein:
the side wall of the receptacle has a set of internal threads; and
the base has a set of external threads that engage the internal threads.

15. The assembly according to claim 10, wherein the intermediate conductor comprises an electrically conductive rod.

16. A method of retrieving and re-running from a well a lower coiled tubing segment containing a lower power cable segment, comprising:

with a splice, splicing an upper end of the lower coiled tubing segment and an upper end of the lower power cable segment to a lower end of an upper coiled tubing segment and a lower end of an upper power cable segment; wherein the step of splicing comprises:

with a lower terminal, electrically connecting together upper ends of lower power conductors in the lower power cable segment;

with an upper terminal, electrically connecting together lower ends of upper power conductors in the upper power cable segment;

with an intermediate connector, electrically joining together the lower and upper terminals;

securing a load supporting member around the intermediate connector and to upper and lower ends, respectively, of the lower coiled tubing segment and the upper coiled tubing segment; then retrieving the lower coiled tubing segment and rolling the upper coiled tubing segment, the splice, and the lower coiled tubing segment onto a reel; then running the lower coiled tubing segment back into the well; and at selected intervals while lowering the lower coiled tubing segment, checking insulation in the upper power cable segment, the splice, and the lower power cable segment by measuring a resistance between an upper end of at least one of the upper power conductors and the upper coiled tubing segment.

17. The method according to claim 16, wherein:
running the lower coiled tubing segment back into the well comprises attaching an electrical submersible pump and motor to a lower end of the lower coiled tubing segment; and wherein
measuring the resistance also measures a resistance between windings of the motor and a housing of the motor.

18. The method of claim 16, wherein electrically connecting together upper ends of lower power conductors in the lower power cable segment with a lower terminal comprises:

forming a receptacle in an upper end of the lower power cable segment with a diameter such that inner portions of upper ends of each of the lower power conductors are exposed within the receptacle; then inserting the lower terminal into the receptacle such that the exposed inner portions of the lower power conductors are in electrical contact with the lower terminal.

19. The method of claim 16, wherein each of the lower electrical conductors has a separate layer of insulation and the layers of insulation are embedded within an elastomeric jacket, the method further comprising:

drilling a receptacle in an upper end of the jacket of the lower power cable segment so as to remove an inner circumferential portion of each of the insulation layers, creating exposed portions of each of the lower power conductors; then inserting the lower terminal into the receptacle such that the exposed portions of the lower power conductors are in electrical contact with the lower terminal.

20. The method according to claim 19, further comprising:

forming internal threads in the side wall of the receptacle; and providing the lower terminal with an external thread, and engaging the external threads with the internal threads.

* * * * *